Figure 1:
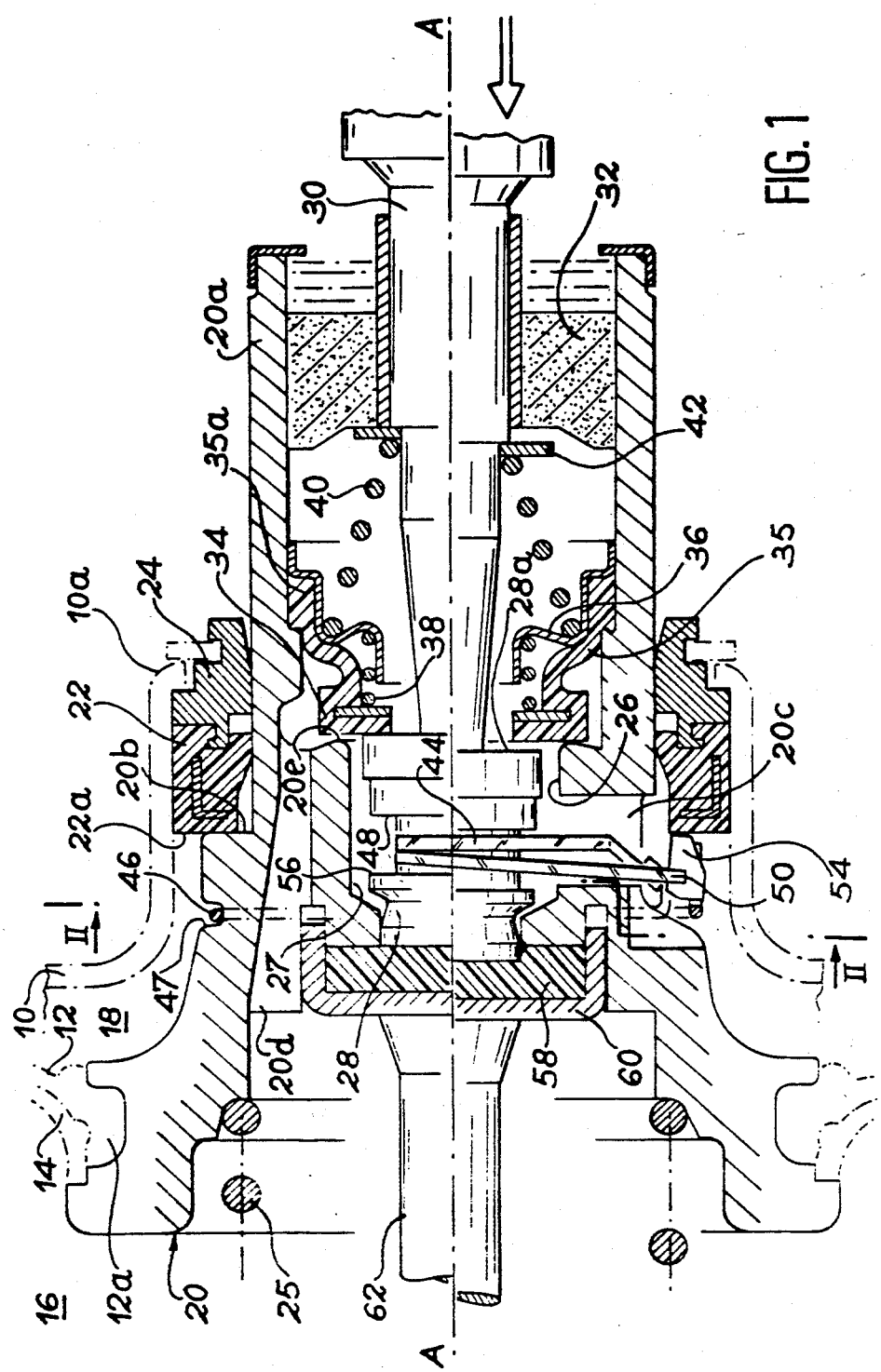

United States Patent [19]

Gautier et al.

[11] Patent Number: 4,907,494
[45] Date of Patent: Mar. 13, 1990

[54] BRAKE BOOSTER WITH RETAINING KEY AND RING

[75] Inventors: Jean-Pierre Gautier, Aulnay Sous Bois; Miguel Perez, Argenteuil; Pedro Verbo, Aulnay Sous Bois, all of France

[73] Assignee: Bendix France, Drancy, France

[21] Appl. No.: 231,410

[22] Filed: Aug. 11, 1988

[30] Foreign Application Priority Data

Sep. 17, 1987 [FR] France .................. 87 12868

[51] Int. Cl.⁴ .............................................. F15B 9/10
[52] U.S. Cl. .................................. 91/369.3; 91/376 R
[58] Field of Search .............. 91/369.1, 369.2, 369.3, 91/376 R

[56] References Cited

U.S. PATENT DOCUMENTS

| | | | |
|---|---|---|---|
| 4,594,937 | 6/1986 | Meynier et al. | 91/369 R |
| 4,643,076 | 2/1987 | Satoh | 91/369.1 |
| 4,765,226 | 8/1988 | Bequet | 91/369.2 |

FOREIGN PATENT DOCUMENTS

| | | | |
|---|---|---|---|
| 0153238 | 8/1985 | European Pat. Off. | |
| 2591172 | 6/1987 | France | |
| 2095778 | 10/1982 | United Kingdom | 91/369.3 |

Primary Examiner—Robert E. Garrett
Assistant Examiner—John Ryznic
Attorney, Agent, or Firm—Larry J. Palguta; Ken C. Decker

[57] ABSTRACT

A stationary stop member (44) and a tilting stop member (50) limiting the stroke of the plunger (28) inside the piston (20) of a brake booster are held in place in the piston, independently of one another, by a retaining ring (46). To this end, a first end (46a) of the retaining ring is bent back against a finger (44b) formed on the stationary stop member, while the second end (46b) of the retaining ring is bent back in an axial groove (54b) formed in a stop (54) fastened to a tongue (50b) formed on the tilting stop member.

6 Claims, 3 Drawing Sheets

BRAKE BOOSTER WITH RETAINING KEY AND RING

The invention relates to a brake booster and is advantageously applied to all motor vehicles whose brake circuit is provided with such a booster.

In U.S. Pat. No. 4,765,226 owned by the company BENDIX FRANCE, there is described a brake booster of conventional design. This booster comprises in particular an external casing, in which a front chamber and a rear chamber are formed on either side of a flexible membrane which is fastened in sealed manner to a mobile hollow piston along the axis of the booster. The front chamber is permanently connected to a vacuum source, while the rear chamber communicates by means of two valves controlled by a common flap either with the front chamber or with the outside air. The positions occupied by these valves depend on the position of a control rod connected to the brake pedal and arranged along the axis of the booster inside the hollow piston. More precisely, the front end of the control rod carries a plunger which has a predetermined axial play inside the piston.

This play is such that the flap which is common to the two valves bears in sealed manner against the seat of a valve formed on the plunger and is disengaged from the seat of a valve formed on the piston when the control rod occupies its rear rest position. The rear chamber then communicates with the front chamber and the piston is applied against a rear stop surface formed on the external casing, under the action of a return spring.

On the other hand, the flap which is common to the two valves bears in sealed manner against the valve seat formed on the piston and is distanced from the valve seat formed on the plunger when the control rod is displaced forwards under the effect of actuating the brake pedal. The communication between the front and rear chambers is then interrupted, and the rear chamber then communicates with the outside air. The piston of the booster is thus displaced forwards under the effect of the difference in pressure between the front and rear chambers, driving by means of its movement an output rod of the booster which actuates the piston of a master cylinder of the brake circuit. Brake boosting is thus ensured.

It can be seen from the preceding description that it is the stroke available to the plunger inside the piston of the booster which determines successively, when the brake pedal is actuated, the closing of the first valve, by means of which the front and rear chambers communicate with one another at rest, and then the opening of the second valve, by means of which the rear chamber thus communicates with the outside air.

In the abovementioned document, this stroke is determined by two stop members mounted inside the piston and placed between two opposing shoulders formed on the plunger. One of these stop members is a plate called a stationary key, which is held immobile in the piston and determines the plunger's maximum position forwards inside the piston when the brake pedal is actuated. The other stop member is a tilting plate, called a tilting key, of which one end is jointed to the stationary key and the other end is bent back to form a stop suitable for bearing against the stop surface formed on the external casing of the booster, thus determining the plunger's maximum position backwards when the brake pedal is not actuated.

In U.S. Pat. No. 4,765,226 owned by the company BENDIX FRANCE, the stationary key is held inside the piston by a retaining ring received in a groove formed in the piston, and whose ends are bent back parallel to the axis of the latter, to bear against the edge of the stationary key which is turned towards the outside of the piston. The tilting key is held in place by the stationary key, a deformed part of the tilting key being enclosed between the base of the mounting formed in the piston to receive the keys and the corresponding edge of the stationary key.

The disadvantage of this known structure is that the assembly of the keys and holding them immobile with the aid of the retaining ring are relatively delicate operations. In particular, it is difficult to ensure that the deformed part of the tilting key is held securely between the stationary key and the base of the mounting. There is therefore a risk that the tilting key is badly mounted and is not held by the stationary key.

Moroever, if the bent back end forming the stop of the tilting key in U.S. Pat. No. 4,765,226 is replaced by a separate stop, for example to faciliate shaping of this stop, it is possible that the latter will fall even if the tilting key is put in position correctly.

In particular, the invention relates to a brake booster in which the assembly of the keys and the holding of them immobile are facilitated, while the risk of mounting the tilting key improperly and, where appropriate, the risk of the separate stop on this key falling are eliminated.

According to the present invention, there is provided a brake booster comprising an external casing, a hollow piston, which is axially mobile in the casing; a first resilient means which tends to displace this piston into a rear rest position in which a bearing surface of the piston is in contact with a stop surface of the external casing; a control rod arranged along the axis of the piston and carrying a plunger at a front end; a second resilient means which tends to displace the control rod into a rear rest position; a valve flap mounted in sealed manner inside the hollow piston, around the control rod; a third resilient means which tends to displace the valve flap forwards to bring it into contact with a first valve seat formed on the plunger, when the control rod occupies its rear rest position, and with a second valve seat formed on the piston, when the control rod is displaced forwards; a stationary stop member mounted in the hollow piston, and on which the plunger bears when the control rod is displaced forwards; a tilting stop member, of which one end is suitable to pivot with respect to the stationary stop member and of which the opposite end carries a stop, the rear rest position of the control rod being determined by the plunger coming to bear on the tilting stop member, and the stop bearing against the stop surface of the casing; and a retaining ring for holding the stationary and tilting stop members, this retaining ring being received in an annular groove formed in the piston and having at least one holding part bearing against one edge of the stationary stop member turned towards the outside of the piston; this booster being characterized in that the retaining ring also has a rectilinear part oriented in parallel with the axis of the piston and received in a groove formed in the stop, so as to enable the tilting stop member to pivot while keeping the latter in the piston.

In a preferred embodiment of the invention, the holding part and the rectilinear part are formed at the ends of the retaining ring.

The stationary stop member consists, for example, of a notched flat plate in a U shape, of which the edge turned towards the outside of the piston has a finger which is bent back towards the said annular groove and against which the said holding part of the retaining ring bears. This latter part can thus be oriented in parallel to the axis of the piston and bent back against the finger at its end.

The tilting stop member consists, for example, of a notched flat plate in a U shape, of which the edge turned towards the outside of the piston has a tongue carrying the stop. To secure it, the stop can therefore have a borehole which is oriented parallel to the axis of the piston and in which there is received a hollowed part of the plate forming the tilting stop member.

Figure 2:
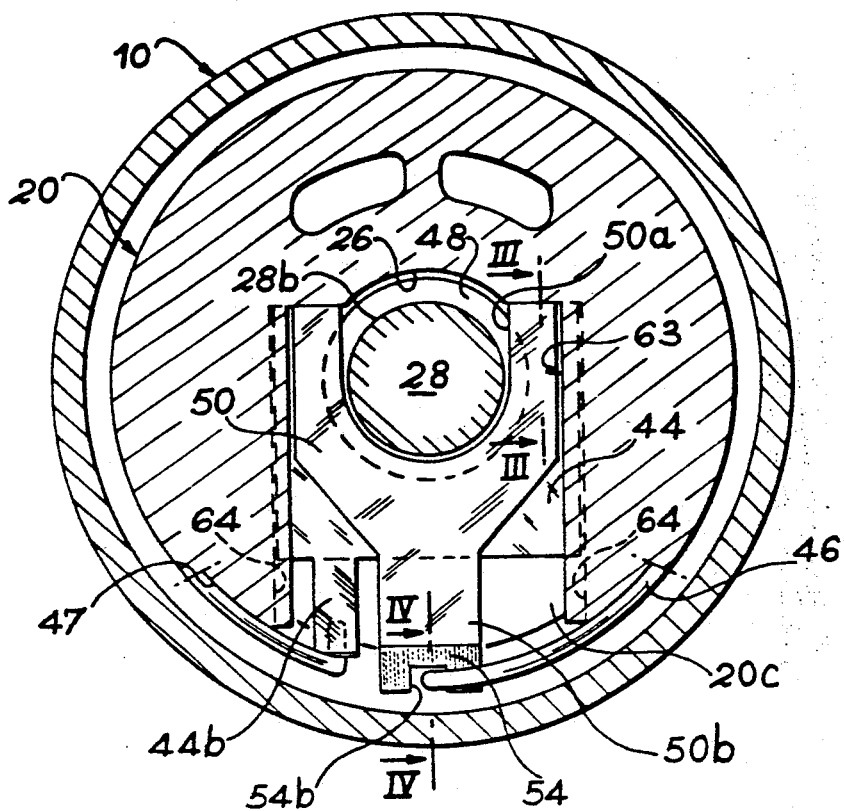
Figure 3:
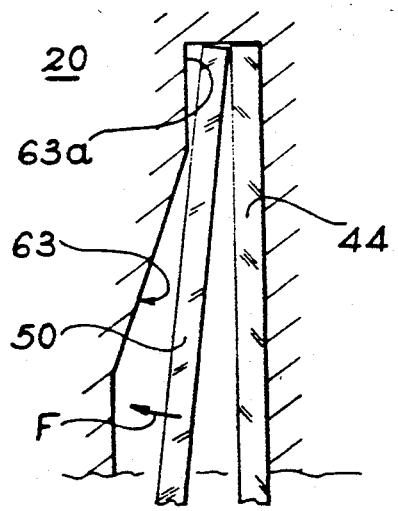
Figure 4:
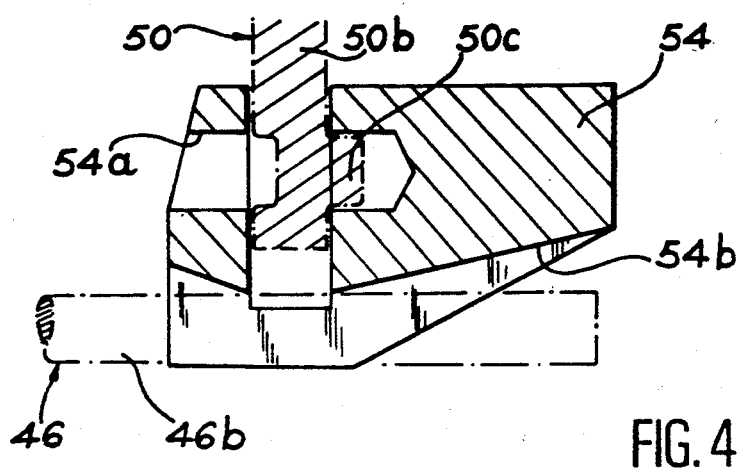
Figure 5:
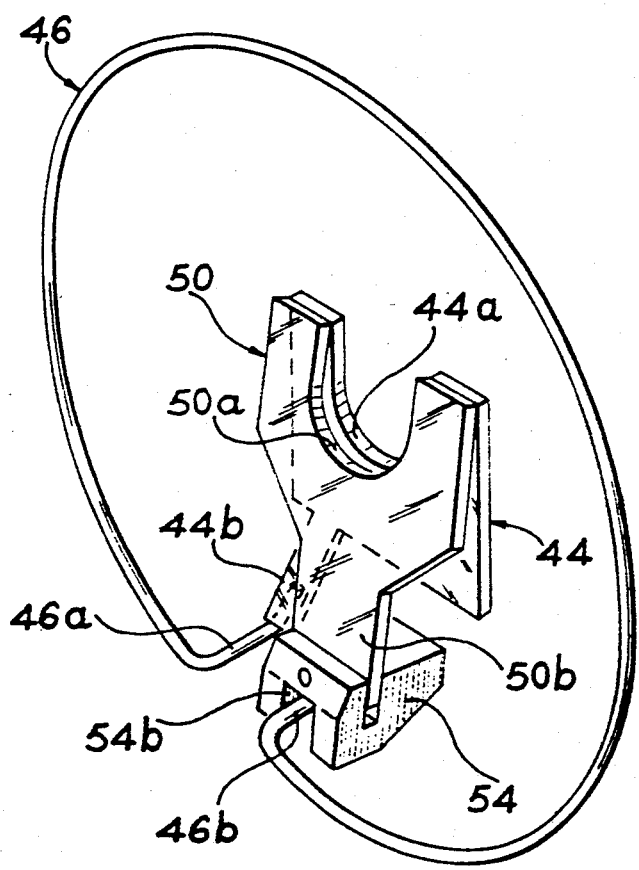

A preferred embodiment of the invention will now be described by way of non-limitative example, with reference to the accompanying drawings, in which:

FIG. 1 is a side view in longitudinal section showing the central part of a brake booster constructed according to the invention, the top and bottom halves of the figure illustrating respectively the positions occupied by the different parts at rest and when the brake pedal is actuated with boost, FIG. 2 is a partial cross-section of the booster along the line II—II of FIG. 1, FIG. 3 is a section on a larger scale along the line III—III of FIG. 2, showing the arrangement of the ends of the stationary key and the tilting key, located inside the piston, FIG. 4, is a section along the line IV-IV of FIG. 2, showing, on a larger scale, the shaped stop fastened to the end of the tilting key, and FIG. 5 is a perspective view of the stationary key, the tilting key and the retaining ring which holds them, in the operating position, the other parts being omitted to facilitate comprehension.

FIG. 1 shows a part of a brake booster provided to be placed in conventional manner between the brake pedal of a vehicle and the master cylinder controlling the hydraulic brake circuit. Conventionally, the part of the booster turned towards the master cylinder is called the front and the part turned towards the brake pedal is called the rear.

The booster in FIG. 1 comprises an external casing 10, which is shell-shaped, having a symmetry of rotation about an axis A—A. Only the central rear part of this casing 10 is shown in FIG. 1.

A flexible elastomer membrane 12, reinforced in its central part by a metal support disk 14, defines, inside the space delimited by the casing 10, a front chamber 16 and a rear chamber 18. The peripheral outside edge (not shown) of the membrane 12 is fastened in sealed manner to the external casing 10, while the internal peripheral edge of this same membrane ends in a flange 12a received in sealed manner in an annular groove formed in the external peripheral surface of a hollow piston 20 arranged along the axis A—A of the booster. This hollow piston 20 extends toward the rear in the shape of a tubular part 20a which passes in sealed manner through the rear wall of the casing 10. The fact that it passes through in sealed manner is ensured by a reinforced annular sealing joint 22 which is fastened by means of a ring 24 in a central tubular part 10a which extends towards the rear the rear wall of the casing 10.

The flat front face 22a of the sealing joint 22 constitutes a stop surface, against which there is applied a shoulder 20b formed on the external surface of the piston 20 and constituting a bearing surface when the booster is at rest. The application of the bearing surface 20b against the stop surface 22a is ensured by a compression spring 25 placed between the piston 20 and the front wall (not shown) of the external casing 10.

In its central part, which is located between the tubular rear part 20a and the front part, and in which there is fastened the membrane 12, the piston 20 has a stepped passage 26 having longitudinal air circulation corridors 27. The front part of this passage, of smaller diameter, receives by means of sliding the front end of a plunger 28 also having a symmetry of rotation about the axis A—A. This plunger 28 is integrally formed with the front end of a control rod 30 also arranged along the axis A—A. The rear end of this rod 30, which projects beyond the rear end of the tubular part 20a of the piston 20, is directly controlled by the brake pedal (not shown).

The annular space delimited between the control rod 30 and the tubular part 20a of the piston 20 opens out towards the outside, at the rear of the booster, by way of an annular air filter 32. Towards the front, this same annular space can communicate with the rear chamber 18 by way of a radial pasage 20c formed in the central part of the piston, communication being controlled by a valve, which will now be described.

This valve comprises an annular valve seat 28a formed on the rear end face of the plunger 28 and an annular flap 34 mounted in the tubular part 20a of the piston. This flap 34 is integrally formed with the front end, of smaller diameter, of a flexible sleeve 35 of elastomer, of which the rear end ends in a flange mounted in sealed manner inside the tubular part 20a. This flange 35a is held in place by a metal plate 36, against which there bears a compression spring 38 which tends to displace the flap 34 forwards, to push it in sealed manner against the seat 28a.

A second passage 20d is formed in the central part of the piston 20, approximately parallel with its axis A—A, to connect the front chamber 16 of the booster with an annular chamber formed around the flap 34, inside the tubular part 20a of the piston. The front chamber 16 and rear chamber 18 can thus communicate with one another by way of the passages 20c and 20d, under the control of another valve. This valve is delimited between the flap 34 and an annular valve seat 20e formed on the rear end face of the central part of the piston 20.

The front end of a compression spring 40 bears against the plate 36 and its rear end bears against a shoulder formed on the control rod 30, via a washer 42. This spring 40 enables the control rod 30 to be brought back again when the brake pedal is released. Secondly, it holds in place the flange 35a of the flexible sleeve 35 carrying the flap 34.

A reaction disk 58 of an elastomeric material is held in contact with the front face of the central part of the piston 20 by a metal collar 60. This collar 60 is fastened to the rear end of an output rod 62 of the booster, and the front end of this output rod 62 actuates the piston of a master cylinder (not shown).

The axial stroke possible for the plunger 28 inside the central part of the piston 20 is limited, in known manner, by two stop members 44 and 50 which are received in a mounting 63 (FIG. 2) formed in the central part of the piston 20, this mounting 63 communicating with the passage 26 inside the piston and opening out radially into the passage 20c.

In accordance with the invention, the stop members 44 and 50 have a specific structure which will now be described in detail with reference to FIGS. 1 to 5.

A first 44 of these stop members, called a stationary key, consists of a flat metal plate mounted perpendicularly to the axis A—A in the mounting 63. This plate 44 is received in slides 64 opposite one another, formed in the sides of the mounting 63. As is shown by FIGS. 2 and 5, its general shape is that of a rectangle having a notch 44a in a U shape, through which passes a central part 28b of reduced diameter of the plunger 28.

On the edge of the plate 44 turned toward the outside of the piston 20 there is formed a rectangular finger 44b which is turned back towards the front with respect to the plane of the plate. The angle formed between the finger 44b and the plate 44 can, in particular, be about 30°. As shown in FIGS. 2 and 5, the finger 44b is offset laterally with respect to the centre of the edge of the plate 44 in which it is formed.

The stationary key 44 is arranged opposite a shoulder 48 which is turned towards the front end formed on the plunger 28. In the case of failure of boosting, the shoulder 48 comes to bear against the key 44 to mechanically transmit the braking effort exerted on the rod 30 to the piston 20.

The second stop member 50, which is mounted in the central part of the piston 20, is a tilting stop member, called a tilting key, composed of a flat metal plate. This plate 50 has a notch 50a in a U shape which is identical to the notch 44a and through which passes the central part 28b, of reduced diameter of the plunger 28.

As shown by FIG. 3, the end of the plate 50 located inside the piston 20 is held bearing against the corresponding end of the plate 44 thanks to a narrow section 63a formed in the base of the mounting 63, against which the plates 44 and 50 bear. However, this narrow section 63a enables the plate 50 to pivot in the direction of the arrow F, in order that its opposite end, turned towards the outside of the piston 20, moves away from the stationary plate 44.

In its central part, the edge of the tilting plate 50 which is turned towards the outside of the piston 20 has a tongue 50b, at the end of which is fastened a shaped stop 54. The stop 54 is fastened to the end of tongue 50b by a hollow section 50c in the tongue which penetrates into a drilled hole 54a formed in the stop 54 parallel to the axis A—A of the piston (FIG. 4).

The stop 54 is designed to come to bear against the stop surface 22a when the booster is not actuated, as shown by the top half of FIG. 1. Under these conditions, the plate 50 is at a certain angle with the stationary key 44 and constitutes a stop against which there can come to bear a shoulder 56 formed on the plunger 28 and turned towards the rear, so as to face the shoulder 48.

In accordance with the invention, the stationary key 44 and the tilting key 50 are held in place independently of one another by a retaining ring 46 which is received in an annular groove 47 formed in the external surface of the piston 20 and slightly offset towards the front with respect to the keys.

Thus, and as shown in FIG. 5, one end 46a of the retaining ring 46 is bent back towards the rear parallel to the axis A—A to come to bear against the end edge of the finger 44b and then towards this axis so as also to bear against the rear face of the finger 44b. In this way, the end 46a of the retaining ring holds the stationary key 44 inside the mounting 63 formed in the piston 20.

Moreover, the opposite end 46b of the retaining ring 46 is also bent back towards the rear parallel to the axis A—A, in order to be mounted in a groove 54b formed parallel to the axis A—A on the face of the stop 54 turned towards the outside of the piston 20. It can be seen from FIG. 4 that the groove 54b is deeper at its ends than in its central part to allow the tilting key 50 to pivot. The end 46b of the retaining ring thus ensures that the tilting key 50 is held in the mounting 63 formed in the piston 20 and prevents the escape of the stop 54, should the latter be fastened improperly to the finger 50b.

Thanks to the construction which has just been described, the mounting of the keys 44 and 50 is facilitated. In particular, the two ends of the retaining ring 46 hold the two keys independently of one another and visibly, such that improper assembly leading to the risk of the tilting key 50 escaping is impossible. Furthermore, the shaped stop 54 is also held by the end 46b of the retaining ring, even in the case of improper fastening of this stop to the tongue 50b of the tilting keye.

When the booster which has just been described is installed in a vehicle, the front chamber 16 permanently communicates with a vacuum source.

When the brake pedal is not actuated, the different elements of the booster occupy the positions shown in the top half of FIG. 1. In particular, the return spring 40 holds the control rod 30 and the plunger 28 in their extreme rear position, where the shoulder 56 of the plunger bears against the tilting key 50, the shaped stop 54 carried by the latter itself bearing against the stop surface 22a. Under these conditions, the seat 28a of the plunger bears in sealed manner against the flap 34, the latter being distanced from the seat 20e of the piston.

The front 16 and rear 18 chambers thus communicate with one another by way of the passage 20d, the play formed between the seat 20e and the flap 34, and the passage 2c. On the other hand, the valve controlling communication of the rear chamber 18 with the outside air is closed. The two chambers 16 and 18 are thus under vacuum and the position of the piston 20 is determined by the action of the compression spring 25, which presses the bearing surface 20b of the piston against the stop surface 22a.

When the driver of the vehicle actuates the brake pedal, the control rod 30 and the plunger 28 are displaced forwards. This displacement has no effect on the piston 20 while the lost motion existing at rest between the flap 34 and the valve seat 20e is not recovered. Then, the flap 34 comes to bear in sealed manner against the seat 20e, thus interrupting communication between the chambers 16 and 18 of the booster.

The displacement forwards of the plunger 28 in the piston 20 continues until the valve seat 28a is at a slight distance from the flap 34. The rear chamber 18 of the booster is then brought into communication with the outside air by way of the passage 20c, the passage formed between the seat 28a and the flap 34 and the annular space delimited between the tubular part 20a of the piston and the control rod 30. The difference in pressure which then occurs between the rear chamber 18 and the front chamber 16, which is still under vacuum, displaces the piston 20 towards the front, which enables pneumatic boosting of the mechanical action of braking, while the displacement towards the front of the control rod continues.

The displacement of the rod 62 controlling the master cylinder is thus ensured by the displacement of the piston 20 of the booster.

When the brake pedal is released, the different elements making up the booster take up the positions shown in the upper half of FIG. 1 again, in particular under the action of springs 40 and 25.

Of course, the invention is not limited to the embodiment which has just been described but also covers all variants.

Thus, the parts of the retaining ring which hold the stationary key and the tilting key may be formed not at the ends of the retaining ring but in another region of the latter. The stationary key may furthermore be held by two parts of the retaining ring which are oriented parallel to the axis of the piston and come to bear against two fingers formed symmetrically on the edge of the stationary key which is turned toward the outside of the piston. Finally, it is possible for the stop 54 not to be separated from the tilting key but to be formed directly on the latter, for example in the shape of a bent back part of the end of the tongue.

Furthermore, the construction making up the keys 44 and 50 and the retaining ring 46 may be used in brake boosters having a different configuration from that which has been described.

We claim:

1. Brake booster comprising an external casing, a hollow piston, which is axially mobile in the casing; first resilient means (25) which tends to displace the piston into a rear rest position in which a bearing surface of the piston is in contact with a stop surface of the external casing; a control rod arranged along the axis of the piston and carrying a plunger at a front end; second resilient means which tends to displace the control rod into a rear rest position; a valve flap mounted in sealed manner inside the hollow piston, around the control rod; third resilient means which tends to displace the valve flap forwards to bring it into contact with a first valve seat formed on the plunger, when the control rod occupies the rear rest position, and with a second valve seat formed on the piston, when the control rod is displaced forwards; a stationary stop member mounted in the hollow piston, and on which the plunger bears when the control rod is displaced forwards; a tilting stop member of which one end is suitable to pivot with respect to the stationary stop member and of which the opposite end has a stop, the rear rest position of the control rod being determined by the plunger coming to bear on the tilting stop member, and the stop bearing against the stop surface of the casing; and a retaining ring for holding the stationary and tilting stop members, this retaining ring being received in an annular groove formed in the piston and having at least one holding part bearing against one edge of the stationary stop member turned towards the outside of the piston; characterized in that the retaining ring also has a rectilinear part oriented in parallel with the axis of the piston and received in a groove formed in the stop, so as to enable the tilting stop member to pivot, while keeping the latter in the piston.

2. Booster according to claim 1, characterized in that the holding part and the rectilinear part are formed at the ends of the retaining ring.

3. Booster according to claim 2, characterized in that the stationary stop member is a notched flat plate in a U shape, of which the edge turned towards the outside of the piston has a finger which is bent back towards the annular groove and against which the holding part of the retaining ring bears.

4. Booster according to claim and 3, characterized in that the holding part of the retaining ring is oriented parallel to the axis of the piston and at an end bent back against the finger.

5. Booster according to claim 4 characterized in that the tilting stop member is a notched flat plate in a U shape, of which the edge turned towards the outside of the piston has a tongue carrying the stop.

6. Booster according to claim 5, characterized in that the stop has a borehole which is oriented parallel to the axis of the piston and in which there is received a hollowed part of the plate forming the tilting stop member.

* * * * *